United States Patent
Akhtar (10) Patent No.: US 8,804,625 B2
(45) Date of Patent: Aug. 12, 2014

(54) PRE-ALLOCATING RESOURCES OF A WIRELESS NETWORK FOR PACKET-SWITCHED REAL-TIME, INTERACTIVE COMMUNICATIONS

(75) Inventor: Haseeb Akhtar, Garland, TX (US)

(73) Assignee: Apple Inc., Cupertino, CA (US)

( * ) Notice: Subject to any disclaimer, the term of this patent is extended or adjusted under 35 U.S.C. 154(b) by 2410 days.

(21) Appl. No.: 10/591,227

(22) PCT Filed: Mar. 4, 2005

(86) PCT No.: PCT/US2005/006854
§ 371 (c)(1),
(2), (4) Date: Aug. 31, 2006

(87) PCT Pub. No.: WO2005/094096
PCT Pub. Date: Oct. 6, 2005

(65) Prior Publication Data
US 2007/0171861 A1   Jul. 26, 2007

Related U.S. Application Data

(60) Provisional application No. 60/551,077, filed on Mar. 8, 2004.

(51) Int. Cl.
*H04W 4/00* (2009.01)
(52) U.S. Cl.
USPC .................................................. 370/329
(58) Field of Classification Search
USPC ........... 455/422.1, 464, 509, 450–453, 435.3; 370/328, 329
See application file for complete search history.

(56) References Cited

U.S. PATENT DOCUMENTS

| | | | | |
|---|---|---|---|---|
| 5,983,099 | A * | 11/1999 | Yao et al. | 455/426.1 |
| 6,374,112 | B1 * | 4/2002 | Widegren et al. | 455/452.2 |
| 6,434,380 | B1 * | 8/2002 | Andersson et al. | 455/406 |
| 6,725,052 | B1 * | 4/2004 | Raith | 455/518 |
| 6,788,664 | B1 | 9/2004 | Thomas | |
| 6,847,827 | B2 | 1/2005 | Helm | |
| 7,158,508 | B2 * | 1/2007 | Abrams et al. | 370/352 |
| 7,277,423 | B1 * | 10/2007 | Welch | 370/352 |
| 7,366,155 | B1 * | 4/2008 | Leppisaari et al. | 370/348 |
| 7,420,951 | B1 * | 9/2008 | Mizell et al. | 370/338 |
| 2009/0303909 | A1 * | 12/2009 | Farhoudi et al. | 370/312 |

FOREIGN PATENT DOCUMENTS

| | | |
|---|---|---|
| CN | 1227036 | 8/1999 |
| CN | 1390425 | 1/2003 |
| WO | WO 9748248 | 12/1997 |
| WO | WO 0120924 | 3/2001 |

OTHER PUBLICATIONS

Chinese Patent Office, First Office Action (translated) for Chinese Application No. 200580007491.1, 10 pgs., Sep. 19, 2008.

* cited by examiner

*Primary Examiner* — Ankur Jain
(74) *Attorney, Agent, or Firm* — Meyertons, Hood, Kivlin, Kowert & Goetzel, P.C.

(57) ABSTRACT

To communicate in a wireless network, resources of at least one node (20A) of the wireless network are pre-allocated (44). The pre-allocated resources (44) comprise resources normally allocated in response to a call setup request. A first call setup request is received after pre-allocating the resources, and in response to the first call setup request, a packet-switched real-time, interactive communications session is established through the wireless network using the pre-allocated resources of the at least one node (20A).

23 Claims, 3 Drawing Sheets

PRE-ALLOCATING RESOURCES OF A WIRELESS NETWORK FOR PACKET-SWITCHED REAL-TIME, INTERACTIVE COMMUNICATIONS

CROSS-REFERENCE TO RELATED APPLICATION

This claims the benefit under 35 U.S.C. §119(e) of U.S. Provisional Application Ser. No. 60/551,077, entitled "Resource Reservation to Minimize Call Setup Delay for PTT," filed Mar. 8, 2004, which is hereby incorporated by reference.

TECHNICAL FIELD

The invention relates generally to pre-allocating resources of a wireless network for packet-switched real-time, interactive communications.

BACKGROUND

A mobile communications network is typically made up of a plurality of cells. Each cell includes a radio base station, with each base station connected to a mobile switching center or a packet service node that manages communications sessions between mobile stations and terminals coupled to a public switched telephone network (PSTN) or a packet-based data network. Communications between mobile stations and base stations are performed over wireless links.

Traditional wireless protocols provide for circuit-switched communications. Such protocols include time-division multiple access (TDMA) protocols and code-division multiple access (CDMA) protocols. In a circuit-switched network, a channel portion between two endpoints (e.g., two mobile stations) is occupied for the duration of the connection between the endpoints.

With the wide availability of the Internet and intranets, packet-switched communications (e.g., web browsing, electronic mail, and so forth) have become more common. Generally, a circuit-switched connection is an inefficient mechanism for communicating packet data. As a result, third generation (3G) and beyond wireless technologies are being developed and implemented to provide higher bandwidth and more efficient packet-switched communications (of data as well as voice and other forms of real-time data) over wireless networks.

One example of a packet-switched wireless technology is defined by the CDMA2000 family of standards, developed by the Third Generation Partnership Project 2 (3GPP2). A CDMA2000 wireless communications network is capable of supporting both circuit-switched services and packet-switched services. For TDMA, packet-switched wireless communications protocols have also been developed, such as the Enhanced General Packet Radio Service (EGPRS) protocol as defined by the 3GPP (Third Generation Partnership Project) UMTS (Universal Mobile Telecommunications System) Release 1999 Standard, and others.

One form of communicating of voice in packet-switched communications is referred to as voice-over-Internet Protocol (IP). In voice-over-IP, voice (and other forms of real-time data) is carried in IP packets in an IP session established between two or more network devices. With advancements in packet-switched wireless technologies, voice-over-IP over packet-switched wireless networks have also been implemented.

A more recent advancement is the proposal of press (push)-to-talk (PTT) over voice-over-IP in a wireless network. This technology is based on PTT over cellular (PoC) technology, which enables real-time, one-to-one or one-to-many voice communications service over a wireless network that is started by pressing or pushing a talk key or button on a mobile station. PTT enables multiple users to communicate with each other, where one party (the caller) has control and right-to-speak at any one time. To acquire the right-to-speak, the caller sends a request (referred to as a floor control request) to a PTT server, where the request is sent in response to pushing of the talk key or button on a mobile station.

To set up a packet-switched real-time, interactive communications session, certain resources are allocated during a call setup procedure for the communications session. The resources allocated during call setup include various software, hardware, and communications resources in nodes of the wireless network as well as in other nodes (e.g., a PTT server or other type of server that supports packet-switched real-time, interactive communications). In many cases, the allocation of resources during the call setup procedure is relatively time consuming, which adds to the overall delay experienced by the user in setting up a packet-switched real-time, interactive communications session. The delay may be unacceptable or inconvenient for certain delay-sensitive applications.

SUMMARY

In general, according to an embodiment, a method of communicating in a wireless network includes pre-allocating, to a packet-switched real-time, interactive communications application, resources of at least one node of the wireless communications network. The pre-allocated resources comprising resources normally allocated in response to a call setup request. A first call setup request is received after pre-allocating the resources, and, in response to the first call setup request, a packet-switched real-time, interactive communications session is established through the wireless network using the pre-allocated resources of the at least one node.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

Figure 1:
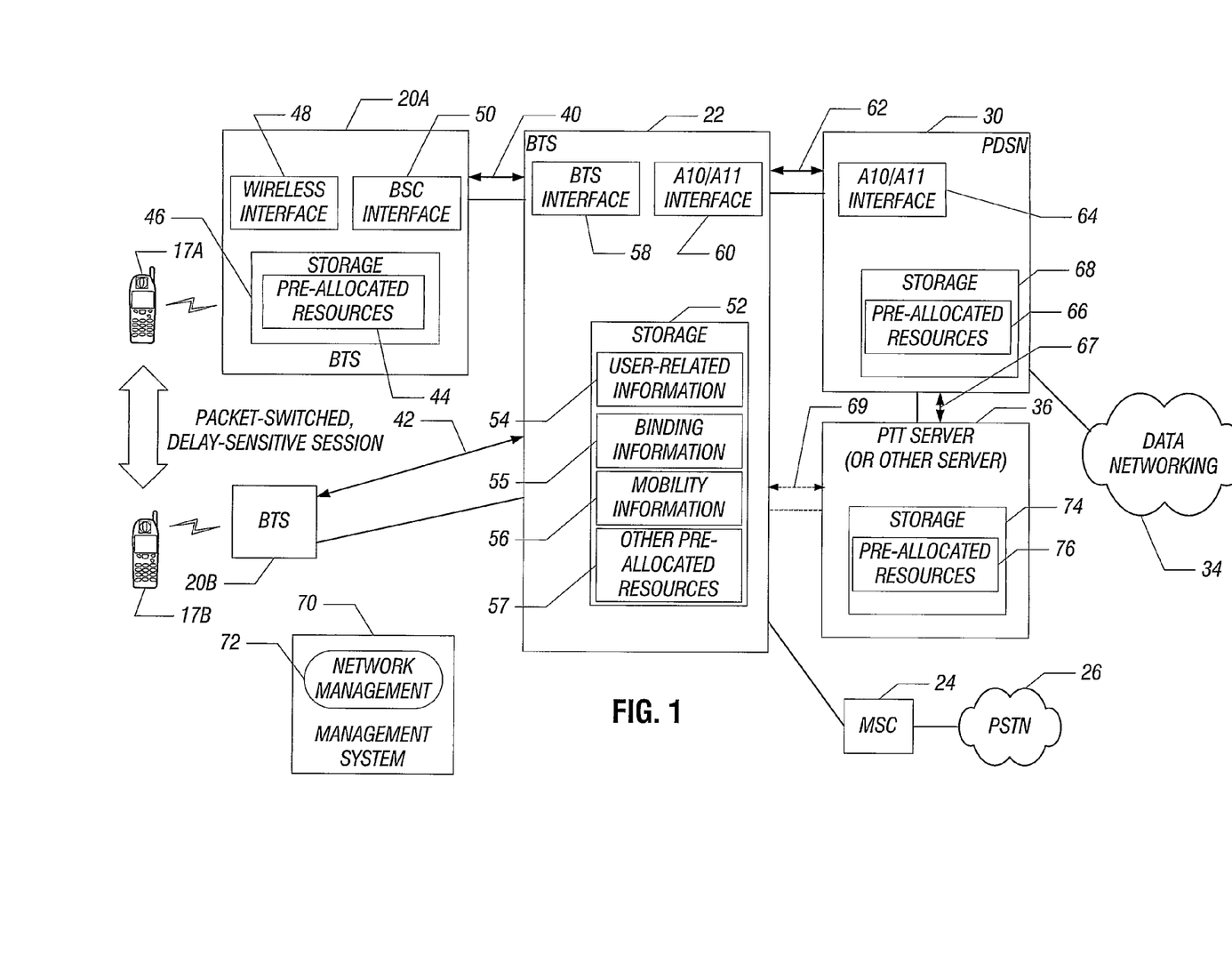
FIG. 1 is a block diagram of an example communications network that incorporates an embodiment.

Referring to FIG. 1, an example communications network includes a wireless or mobile communications network that is coupled to a packet data network 34 (such as a local area network (LAN), wide area network (WAN), Internet, and so forth). According to an embodiment, the wireless communications network includes components that operate according to CDMA (code-division multiple access) 2000. CDMA2000 is defined by the CDMA2000 family of standards (including the TIA-2000 standards, TIA-2001 standards, and the TIA-835 standards). However, in other embodiments, other types of wireless protocols can be used for communications in the wireless communications network, including other versions of CDMA protocols, TDMA (time-division multiple access) protocols, GSM (Global Systems for Mobile Communications), UMTS (Universal Mobile Telecommunications System) protocols, or other wireless protocols.

The wireless communications network includes multiple cell segments each including a base transceiver subsystem (BTS) 20A, 20B for performing radio telecommunications with mobile stations 17A, 17B within the coverage area of the respective cell segment. A "cell segment" refers to either a cell or cell sector. The BTS entities 20A, 20B are connected to one or more base station controllers (BSCs) 22.

For communicating circuit-switched voice traffic, the BSC 22 is coupled to a mobile switching center (MSC) 24, which is responsible for switching mobile station-originated or mobile station-terminated circuit-switched traffic. Effectively, the MSC 24 is the interface for signaling and user traffic between the wireless network and other circuit-switched networks (such as a public switched telephone network (PSTN) 26 or other MSCs). The PSTN 26 is connected to landline terminals (not shown).

The wireless communications network also supports packet data services, in which packet data is communicated between a mobile station and another endpoint, which can be a terminal coupled to the packet data network 34 or another mobile station that is capable of communicating packet data. Packet data is communicated in a packet-switched communications session established between the mobile station and the other endpoint through a packet data serving node (PDSN) 30. For other types of wireless networks, the PDSN 30 can be substituted with an SGSN (Serving GPRS support node), a GGSN (Gateway GPRS support node), or an IWF (inter-working function) server.

The PDSN 30 establishes, maintains, and terminates link layer sessions to mobile stations, and routes mobile station-originated or mobile station-terminated packet data traffic. The PDSN 30 is coupled to the packet data network 34, which is connected to various endpoints, such as computers and network telephones (not shown) (a network telephone is a telephone that is fitted with a network interface card for communications over packet data networks). Examples of packet-switched communications include web browsing, electronic mail, text chat sessions, file transfers, interactive game sessions, packet-switched voice sessions, push-to-talk sessions, and so forth.

The wireless communications network thus provides two different types of communications: circuit-switched communications and packet-switched communications. Circuit-switched communications are routed through the MSC 24, while packet-switched communications are routed through the PDSN 30. In circuit-switched communications, a dedicated end-to-end circuit or channel is established for the duration of a call session. However, packet-switched communications utilize a connectionless intranetwork layer, such as that defined by the Internet Protocol (IP). One version of IP, referred to as IPv4, is described in Request for Comments (RFC) 791, entitled "Internet Protocol," dated September 1981; and another version of IP, referred to as IPv6, is described in RFC 2460, "Internet Protocol, Version 6 (IPv6) Specification," dated December 1998. In packet-switched communications, packets or other units of data carry routing information (in the form of network addresses) that are used to route the packets or data units over one or more paths to a destination endpoint.

The mobile station 17A, 17B are capable of participating in packet-switched real-time, interactive communications sessions with each other, or with a node coupled to data network 34, through the wireless communications network (which includes the BTS 20A, 20B, BSC 22, and PDSN 30). The BSC 22 includes a packet based processing function, such as a Packet Control Function (PCF) for CDMA-based wireless access technology that directly interfaces (via A10 and A11 as defined by 3GPP2) with the PDSN. In another embodiment, the BSC 22 may include the packet SGSN and GGSN functions as defined by 3GPP to provide an interface to any packet based networks (such as Internet, intranet, etc.).

A "real-time, interactive communications session" refers to an exchange of data, such as audio and/or video and/or text, on a substantially real-time basis between two terminals. A session is substantially real-time if interaction is occurring between two terminals, in which a communication from one endpoint is followed relatively quickly by a response or another communication from the other endpoint, typically within seconds, for example. A real-time, interactive communications session is distinguished from exchanges of electronic mail (e-mail) between two terminals.

A "packet-switched real-time, interactive communications session" refers to a real-time, interactive communications session that is established over a packet-switched network, which can include a wired network and/or a wireless network. Examples of packet-switched real-time, interactive communications sessions include voice-over-IP call sessions, press (push)-to-talk (PTT) sessions, text chat sessions, instant messaging sessions, and so forth.

The terms "press-to-talk" and "push-to-talk" are used interchangeably. A "PTT communications session" or "PTT session" refers to a communications session in which one user (the caller) is able to establish real-time, one-to-one or one-to-many voice communications (and/or other real-time communications such as video, or video and voice) by simply pressing a talk button or key on a mobile station. In response to activation of the talk button or key during a PTT session, a request is sent to a PTT server 36 that is coupled to the data network 34. The request sent by the mobile station in response to activation of the talk button or key is a floor control request that seeks the right or ability to talk in the PTT session.

Note that a PTT session involving two or more users is initially established by the use of call control signaling, such as Session Initiation Protocol (SIP) signaling or another type of call control signaling. SIP is described in RFC 2543, entitled "The Session Initiation Protocol (SIP) Specification," dated March 1999. SIP defines control signaling for establishing multimedia sessions over packet-switched networks. Once the PTT session is established, any of the users involved can seek the right or ability to talk by activating the talk button or key on a respective PTT-enabled mobile station or other terminal. Note that a PTT endpoint (that is involved in a PTT session) can be any terminal, including wired (landline) terminals or wireless terminals. Voice-over-IP, text chat, and instant messaging sessions can also be established using SIP or another type of call control signaling.

Conventionally, during establishment of a packet-switched real-time, interactive communications session, such as any of the communications sessions listed above, various resources of the nodes in the communications network are allocated during the call setup procedure. A "call setup procedure" is a procedure performed in response to a "call setup request" or "call request." A "call setup request" or "call request" refers to any request for setting up a communications session, such as a packet-switched real-time, interactive communications session. The allocation of resources during a call setup procedure can be time consuming, and adds to the delay experienced by the user. The delay caused by allocating certain resources during the call setup procedure may not be acceptable for certain packet-switched, delay-sensitive applications, such as voice-over-IP applications, PTT applications, text chat or instant messaging applications, and so forth.

In accordance with some embodiments, at least some of the resources that are normally allocated during the call setup procedure are pre-allocated. Pre-allocation of resources can be performed during provisioning or registration of network nodes or mobile stations. The resources that are pre-allocated include software, hardware, and communications resources. Resources in the BTS 20A, 20B, BSC 22, PDSN 30, and/or PTT server 36 can be pre-allocated. A resource is said to be "normally" allocated during a call setup procedure if, according to current conventional communications protocols (wireless or wired protocols), the resource is allocated during the call setup procedure. A resource that is normally allocated during the call setup procedure is also referred to as a "call setup resource."

Pre-allocation of resources can be performed in response to various events. For example, the pre-allocation of resources can occur in response to initial startup of the nodes of the communications network depicted in FIG. 1. Alternatively, or in addition, other events that can lead to pre-allocation of resources include initiation of a mobile station, or a group of mobile stations. For example, such other events include when a mobile station initially starts up in a wireless network, initially enters a wireless network, launches a real-time, interactive application (such as a PTT application, voice-over-IP application, or text chat/instant messaging application). In another embodiment, the pre-allocation of resources can be initiated by a specific user or group of users launching a real-time, interactive application (such as a PTT application, voice-over-IP application, or text-chat/instant-messaging application).

In the ensuing discussion, reference is made to pre-allocating resources for PTT sessions. However, note that the same or similar techniques can be applied to other forms of packet-switched real-time, interactive communications sessions.

As depicted in FIG. 1, a PTT session can be established between mobile stations 17A and 17B. Alternatively, a PTT session can be established between one of the mobile stations 17A, 17B, and a node coupled to the data network 34.

Each of the mobile stations 17A, 17B communicates with the PTT server 36 for establishing PTT sessions. The mobile station 17A communicates with the PTT server 36 through the BTS 20A, BSC 22, and PDSN 30. The mobile station 17B communicates with the PTT server 36 through the BTS 20B, BSC 22, and PDSN 30. For other forms of packet-switched, delay-sensitive communications, the PTT server 36 can be substituted with another type of server, such as a voice-over-IP server (e.g., SIP proxy server), a text chat or instant messaging server, a call session control function (CSCF) module (according to 3GPP or 3GPP2), and so forth.

Alternatively, the BSC 22 can be connected to the PTT server 36 without passing through the PDSN 30. The link between the BSC 22 and PTT server 36 in this alternative configuration is depicted by the dashed lines of FIG. 1.

The pre-allocation of resources in accordance with some embodiments also enables dedicated links to be established between the various nodes of the communications network depicted in FIG. 1. The dedicated link between the BTS 20A and the BSC 22 is a link 40, and the dedicated link between the BTS 20B and the BSC 22 is a link 42. The dedicated link between the BSC 22 and the PDSN 30 is a link 62, and the dedicated link between the PDSN 30 and PTT server 36 is a link 67. In the alternative embodiment where the BSC 22 is connected to the PTT server 36 without passing through the PDSN 30, the dedicated link between the BSC 22 and the PTT server 36 is a link 69.

Information 44 pertaining to pre-allocated resources of the BTS 20A is stored in a storage 46. Examples of resources (software, hardware, and/or communications resources) that can be pre-allocated in the BTS 20A include one or more of the following: channel elements (channels of trunks), modems (for modem communications, if any, between the BTS and BSC as well as between MS and BTS), RF (radio frequency) channels (RF channels to be used by a given mobile station or group of mobile stations), routing elements (router(s), if any, to be used for communications between the BTS and BSC), T1/E1 trunks, Ethernet links, static IP routes, BTS software elements, memory, processors, and other resources. Resources can be pre-allocated for a particular packet-switched, delay-sensitive application (e.g., PTT application, voice-over-IP application, text chat application, instant messaging application, etc.) that is executed in a given mobile station or group of mobile stations.

The link 40 between the BTS 20A and BSC 22 can be one of various types of links: a T1/E1 trunk, an Ethernet link, a static IP route, a dynamic IP route, and so forth. Pre-allocating a T1/E1 trunk refers to pre-assigning channel(s) of a T1/E1 trunk for communications of a particular packet-switched, delay-sensitive application in a given mobile station or group of mobile stations. Pre-allocating an Ethernet link refers to pre-allocating a destination Ethernet address to which packets associated with the packet-switched, delay-sensitive application are to be routed. The destination Ethernet address contained in the information 44 relating to pre-allocated resources is an Ethernet address of the BSC 22.

A pre-allocated static IP route refers to an IP route having a desired quality of service (QoS) for communicating packets of a packet-switched, delay-sensitive application executable in a given mobile station or group of mobile stations. Pre-allocating IP routes (either static or dynamic) between nodes of the communications network involves allocating one or more IP routes having predetermined QoS for packet-switched, delay-sensitive applications. Packets associated with a particular packet-switched, delay-sensitive application are treated as higher-priority packets that are routed over the pre-allocated IP routes. A QoS framework, such as an IntServ (integrated services) or DiffServ (differentiated services) framework, can be used for routing the higher-priority packets over the pre-allocated IP routes. An example IntServ framework is provided by the Resource Reservation Protocol (RSVP), as described in RFC 2205, entitled "Resource Reservation Protocol (RSVP)," dated September 1997. A DiffServ framework is a reservation-less framework that provides differentiated classes of service for network traffic by classifying packets communicated over the network.

The BTS 20A includes a wireless interface 48 for communicating wireless signaling (e.g., RF signaling) with the mobile station 17A. Additionally, the BTS 20A includes a BSC interface 50 for communicating over the link 40 with the BSC 22. The BTS 20B contains the same elements as the BTS 20A.

The BSC 22 also includes a storage 52 for storing information used for pre-allocating resources in the BSC 22 for a particular packet-switched, delay-sensitive application in a mobile station or group of mobile stations. The information stored in the storage 52 includes user-related information 54, binding information 55, mobility information 56, and information 57 for other pre-allocated resources.

The user-related information 54 includes information such as the network access identifier (NAI) of a mobile station (user), an IP address of a mobile station (user), the quality of service (QoS) assigned to the mobile station (user) for a packet-switched, delay-sensitive application, the grade of service (GoS) assigned to the mobile station (user) for a packet-switched, delay-sensitive application, and a pointer (e.g., a binary-coded unique number) assigned to the mobile station (user) to enable the pre-allocation or reserving of resources for the particular mobile station (user). Such pointers are used by the network elements (e.g., BTS, BSC, PDSN, PTT server, and any link connecting these nodes) to allow the mobile station or a group of mobile stations (associated with a specific pointer) to claim and use these pre-allocated resources (that are tied to a specific pointer) during the call setup procedure. Note that assigning resources to a mobile station is used interchangeably with assigning resources to a user.

Instead of user-related information pertaining to a single mobile station (user), the user-related information 54 can contain information pertaining to a group of mobile stations (users). For example, users can be divided into various levels, such as a first level, second level, and third level, which are associated with different bandwidth, channel, and/or circuit allocations for a packet-switched, delay-sensitive applications.

The binding information 55 establishes a relationship between the radio domain and the packet domain for a specific mobile station or a group of mobile stations. One example of this is to create a binding between a radio-related address of a mobile station, such as the international mobile subscriber identity (IMSI), mobile identification number (MIN), or mobile equipment ID (MEID), and the packet-related address of the mobile station, such as the IP address, NAI, and Ethernet address. As with the user-related information, the binding information 55 is pre-allocated during provisioning or registration of a mobile station, or at any other time prior to a call setup procedure in which the resources would normally be allocated.

For example, an IMSI of a mobile station can be mapped to the mobile station's NAI in such a way that the software resources needed for binding are all allocated during the provisioning or registration time, or at some other time prior to the call setup procedure. When the mobile station initiates a session, the mobile station does not need to have the network allocate the resources needed for binding the radio and packet domains.

The mobility information 56 is related to the mobility behavior of a mobile station or a group of mobile stations. As an example, the mobility information 56 can identify the active cell sectors that are to be used for soft handoff service of a particular mobile station or group of mobile stations. Also, the mobility information 56 can specify transcoders to be used for transforming air interface specific vocoding (such as EVRC) to landline-based vocoding (such as PCM, G-711, and so forth). The mobility information 56 also identifies transport resources between the BTS, BSC, and MSC.

The BSC 22 includes a BTS interface 58 for communicating over the link to the BTS 20A. A similar BTS interface (not shown) is provided for communicating with the BTS 20B. Additionally, the BSC 22 includes an A10/A11 interface 60 for communicating over link 62 with the PDSN 30. An A11 interface defined between the BSC 22 and the PDSN 30 carries control signaling between these two nodes. The A10 interface carries user traffic between the BSC 22 and PDSN 30.

Information 66 pertaining to pre-allocated resources of the PDSN 30 is stored in a storage 68. The PDSN 30 also includes an A10/A11 interface 64 for communicating with the BSC 22. The pre-allocated resources of the PDSN 30 include routing elements, A10/A11 interfaces, T1/E1 trunks, PDSN software elements, memory, processors, and other resources for a particular packet-switched, delay-sensitive application. The PTT server 36 also contains a storage 74 that stores information 76 pertaining to pre-allocated resources of the PTT server 36. The pre-allocated resources of the PTT server 36 include routing elements, transcoders, T1/E1 trunks, PTT server software elements, memory, processors, and other resources for a mobile station or group of mobile stations.

As further depicted in FIG. 1, a management system 70 includes a network management module 72. In one embodiment, the management module 72 is a software module executable on processor(s) in the management system 70. The management system 70 is capable of communicating with the BTS 20A, 20B, BSC 22, PDSN 30, and PTT server 36 to provision these nodes, which includes the pre-allocation of resources in these nodes. Under control of the network management module 72, the management system 70 responds to predetermined events by sending requests to the various nodes of the communications network to pre-allocate resources.

Figure 2:
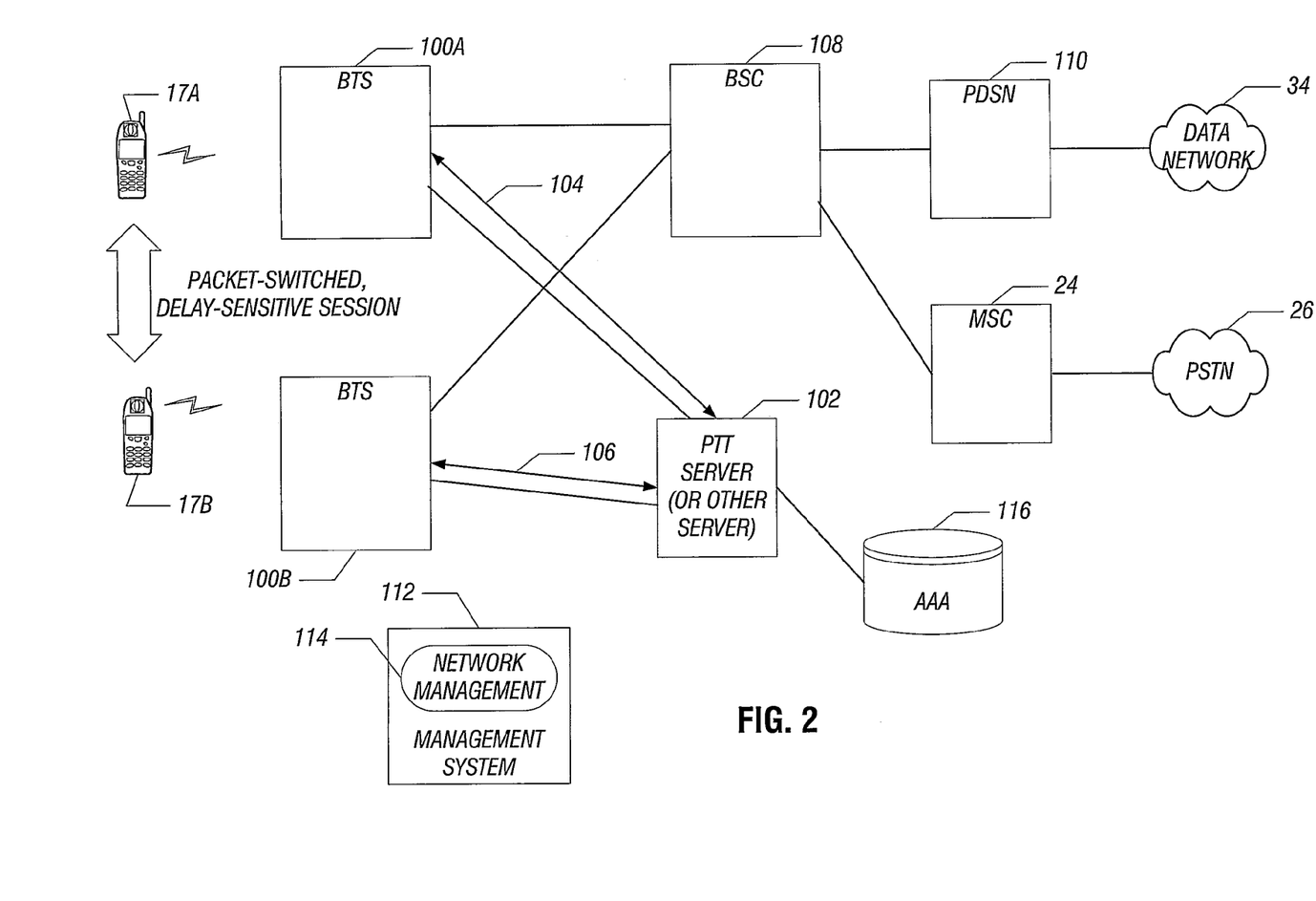
FIG. 2 is a block diagram of another example communications network that incorporates an embodiment.

FIG. 2 illustrates an alternative embodiment of a communications network. In the embodiment of FIG. 2, mobile stations 17A, 17B communicate wirelessly with respective BTS 100A, 100B. Unlike the arrangement of FIG. 1, the BTS 100A, 1000B are capable of communicating over links 104, 106 with a PTT server 102. Consequently, the BTS 100A, 100B do not need to communicate through the BSC 108 with the PTT server 102. The BSC 108 also communicates with a PDSN 110 that is coupled to the data network 34.

A management system 112, on which a management module 114 is executable, also performs provisioning (including pre-allocating resources) of nodes of the communications network of FIG. 2, including nodes BTS 100A, 100B, BSC 108, PDSN 110, and PTT server 102. The management system 112 is similar to the management system 70 of FIG. 1.

As further depicted in FIG. 2, the PTT server 102 is coupled to an AAA (Authentication, Authorization, and Accounting) server 116. The AAA server 116 provides authentication, authorization, and accounting services for network nodes. AAA is described in RFC 2977, entitled "Mobile IP Authentication, Authorization, and Accounting Requirements," dated October 2000.

The AAA server 116 is also accessible by the other nodes of the network, including BTS 100A, BSC 108, and PDSN 110. Also, although not depicted in FIG. 1, an AAA server can also be provided in the communications network of FIG. 1.

Figure 3:
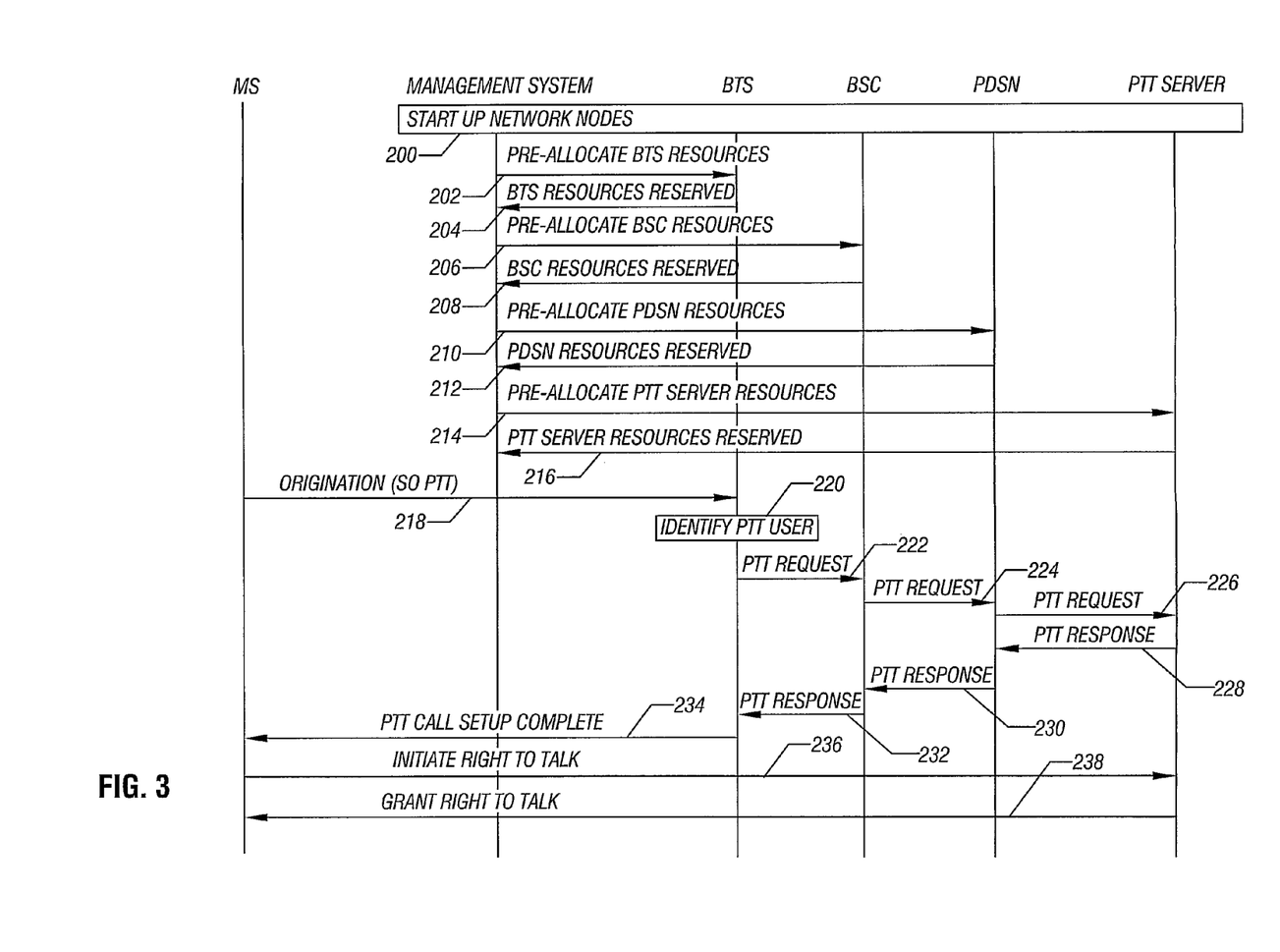
FIG. 3 is a message flow diagram of a process of provisioning nodes of a communications network and setting up a packet-switched real-time, interactive communications session, in accordance to an embodiment.

FIG. 3 is a message flow diagram of a process according to an embodiment. Initially, network nodes (including the management system, BTS, BSC, PDSN, and PTT server) are started up and brought into operational mode (at 200). At this point, the management system is able to provision the other network nodes, including the BTS, BSC, PDSN, and PTT server. Part of this provisioning includes the pre-allocating of resources for a packet-switched, delay-sensitive application in a mobile station or group of mobile stations.

The management system performs pre-allocation of resources in response to predetermined events, such an initial startup of nodes of the communications network (at 200), initiation of a mobile station (such as when a mobile station first starts up, first enters a wireless network, or launches a packet-switched, delay-sensitive application). In response to one of these predetermined events, the management system sends (at 202) to the BTS a request to pre-allocate BTS resources. The BTS performs resource pre-allocation in response to this request and stores the information 44 (FIG. 1) relating to the pre-allocated resources. The BTS then sends (at 204) an acknowledgment that the BTS resources have been reserved.

Similarly, the management system sends (at 206) to the BSC a request to pre-allocate BSC resources. In response to this request, the BSC pre-allocates resources and stores information pertaining to such pre-allocated resources in the storage 52 (FIG. 1). The BSC then sends (at 208) an acknowledgment that the BSC resources have been reserved.

The management system also sends (at 210) to the PDSN a request to pre-allocate PDSN resources. In response, the PDSN pre-allocates resources, and stores information 66 (FIG. 1) pertaining to such pre-allocated resources in its storage 68 (FIG. 1). The PDSN then sends (at 212) an acknowledgment that the PDSN resources have been reserved. Next, the management system sends (at 214) to the PTT server a request to pre-allocate PTT server resources. In response, the PTT server performs pre-allocation of resources and stores information 76 pertaining to such pre-allocated resources in its storage 74 (FIG. 1). The PTT server then sends (at 216) an acknowledgment that the PTT server resources have been reserved.

At this point, pre-allocation of resources for packet-switched, delay-sensitive application(s) has been performed to enable faster setup of packet-switched real-time, interactive communications sessions.

In the FIG. 3 example, the mobile station sends (at 218) an origination message (call setup request) to establish a PTT call session. The origination message sent at 218 can include a PTT service option (SO) information element to identify the request as being associated with a PTT session. The service option information element is used by the BTS to determine that the message is related to a PTT session, so that the BTS can route the origination message accordingly.

Next, the BTS identifies (at 220) the PTT user, based on information contained in the origination message. Instead of the BTS performing the identification of the PTT user, the BSC can perform the identifying act. The BTS/BSC can identify the PTT user by looking at the service option information element or by accessing a subscriber database. The BTS/BSC also performs authentication of the user (described further below) as part of the identifying act.

The BTS sends (at 222) a PTT request to the BSC, using pre-allocated resources (including dedicated channels such as T1/E1 trunks, Ethernet links, or static IP routes). The BSC forwards (at 224) the call setup message (such as an A11-Registration request) to the PDSN, again using pre-allocated resources (such as a pre-allocated A10/A11 interface).

The PDSN sets up the call by sending a PTT request (at 226) to the PTT server (using pre-allocated resources). The PTT server responds (at 228) with a PTT response. The PDSN sends a PTT response through the same (or other) pre-allocated resources to the BSC. The BSC in turn sends (at 232) a PTT response to the BTS, again using pre-allocated resources. The BTS completes the PTT call setup and notifies (at 234) that the PTT call setup procedure has been completed.

After completion of call setup procedure, a user can obtain a right-to-speak by activating a talk or speak button on the mobile station. The term "right-to-talk" or "ability-to-talk" refers to a particular terminal acquiring a token or other indication that a terminal is now able to transmit voice or other forms of real-time data to other terminals involved in the PTT call session. The mobile station initiates (at 236) this right-to-talk by sending a floor control request. The PTT server acknowledges (at 238) by granting the right-to-talk.

By reserving or pre-allocating resources at the nodes of a communications network, such as the BTS, BSC, PDSN, and PTT server, call setup time can be reduced for specific packet-based, delay-sensitive applications, such as PTT applications, voice-over-IP applications, text chat applications, and instant messaging applications. Instead of allocating these resources at call setup time, the resources are pre-allocated while provisioning the network, prior to call setup time.

As discussed above, in identifying the PTT user, authentication of the user is performed. Authentication can be performed by accessing an AAA server or by other techniques. Also, for quicker authentication, the BTS or BSC can maintain a cache of the most recently authenticated users. In this manner, the BTS or BSC can access local storage to quickly authenticate a user. If a user cannot be found in the cache, then the BTS or BSC can access an external database.

For faster call setup, the authentication process can be performed in the background while the call setup procedure continues. Thus, the PTT request can be forwarded by the BTS to the BSC and by the BSC to the PDSN, and so forth, without having to wait for completion of the authentication process. However, the authentication will have to be completed before the PTT call setup complete notification can be sent (at 234) to the mobile station.

Instructions of the various software modules (e.g., software modules executed in BTS, BSC, PDSN, PTT server, management system) are loaded for execution on corresponding. Processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each entity in one of many different ways. For example, code segments including instructions stored on floppy disks, CD or DVD media, a hard disk, or transported through a network interface card, modem, or other interface device are loaded into the entity and executed as corresponding software routines or modules. In the loading or transport process, data signals that are embodied in carrier waves (transmitted over telephone lines, network lines, wireless links, cables, and the like) communicate the code segments, including instructions, to the entity. Such carrier waves are in the form of electrical, optical, acoustical, electromagnetic, or other types of signals.

While some embodiments have been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method of communicating in a wireless network, comprising:
pre-allocating, to a packet-switched real-time, interactive communications application, resources of at least one node of the wireless network, wherein the pre-allocated resources are call setup resources, the pre-allocated resources comprising resources normally allocated in response to a call setup request, wherein the pre-allocated resources enable avoidance of allocating the pre-allocated call setup resources during a call setup procedure in response to the call setup request, wherein the pre-allocated resources include at least one of hardware, software, and communications elements, wherein the at least one of hardware, software, and communications elements include resources relating to a link with a pre-determined quality of service, wherein the pre-allocating is performed by a system having a processor, and the pre-allocating includes storing a pointer associated with a particular mobile station or a particular group of mobile stations, where the pointer indicates that the pre-allocated resources are useable by the particular mobile station or particular group of mobile stations for call setup;
receiving, from the particular mobile station or a member of the particular group of mobile stations, a first call setup request after pre-allocating the resources; and
establishing, in response to the first call setup request, a packet-switched real-time, interactive communications session through the wireless network using the pre-allocated resources of the at least one node.

2. The method of claim 1, wherein pre-allocating the resources comprises pre-allocating resources of one of a base transceiver system and base station controller.

3. The method of claim 1, wherein pre-allocating the resources comprises pre-allocating resources of a packet data serving node.

4. The method of claim 1, wherein pre-allocating the resources comprises pre-allocating resources of at least one of a press-to-talk server, voice-over-Internet Protocol server, and a call session control function module.

5. The method of claim 1, wherein pre-allocating the resources further comprises allocating the link between the at least one node and a second node in the wireless network to carry call control packets for the packet-switched real-time, interactive communications application, wherein the link comprises a dedicated channel.

6. The method of claim 5, wherein allocating the dedicated channel between the at least one node and the second node in the wireless network to carry packets for the packet-switched real-time, interactive communications application comprises allocating one of a T1/E1 trunk, Ethernet link, and IP route.

7. The method of claim 1, wherein pre-allocating the resources comprises pre-allocating binding information of a mobile station, the binding information to establish a relationship between a radio domain and a packet domain, the method further comprising:
storing the binding information in a base station controller; and
using the binding information stored in the base station controller for establishing the packet-switched real-time, interactive session in response to the first call setup request.

8. The method of claim 7, wherein pre-allocating the resources comprises pre-allocating user-related information of the particular mobile station, the method further comprising:
storing the user-related information in the base station controller, wherein the user-related information indicates the predetermined quality of service assigned to the particular mobile station; and
using the user-related information stored in the base station controller for establishing the packet-switched real-time, interactive session in response to the first call setup request.

9. The method of claim 1, wherein pre-allocating the resources comprises pre-allocating binding information of the particular group of mobile stations, the method further comprising:
storing the binding information in a base station controller, wherein the binding information is to establish a relationship between a radio domain and a packet domain; and
using the binding information stored in the base station controller for establishing the packet-switched real-time, interactive session in response to the first call setup request.

10. The method of claim 1, further comprising:
in response to an event, a management system sending a request to pre-allocate resources to the at least one node, wherein pre-allocating the resources is performed in response to the request to pre-allocate.

11. The method of claim 10, wherein sending the request to pre-allocate is performed during a provisioning process.

12. The method of claim 1, wherein pre-allocating the resources is performed in response to initiation of a mobile station.

13. The method of claim 1, wherein the pre-allocated resources include a pre-allocated Internet Protocol (IP) route having the predetermined quality of service.

14. A system comprising:
an interface to a communications network; and
a controller having a processor and coupled to the interface to:
receive a request to pre-allocate call setup resources in the system to a packet-switched real-time, interactive application;
in response to the request, pre-allocate the call setup resources, wherein the pre-allocated call setup resources include at least one of hardware, software, and communications elements of the system, the at least one of hardware, software, and communications elements of the system comprising a pre-allocated Internet Protocol (IP) route having a particular quality of service;
receive a call setup request after pre-allocating the call setup resources; and
in response to the call setup request, set up a packet-switched real-time, interactive communications session using the pre-allocated call setup resources including the pre-allocated IP route, wherein the pre-allocated call setup resources enable avoidance of allocating the pre-allocated call setup resources during a call setup procedure in response to the call setup request.

15. The system of claim 14, wherein the pre-allocated call setup resources further include at least one of user-related information, binding information, and mobility information, the system further comprising a storage to store the at least one of user-related information, binding information, and mobility information, the controller to set up the packet-switched real-time, interactive communications session in response to the call setup request using the at least one of the user-related information, binding information, and mobility information.

16. The system of claim 14, wherein the pre-allocated call setup resources further comprise a dedicated channel between the system and another node in a wireless network.

17. The system of claim 14, comprising one of a base transceiver system, base station controller, and packet data serving node of a wireless network.

18. The system of claim 14, wherein the packet-switched real-time, interactive application comprises at least one of a press-to-talk application, voice-over-Internet Protocol application, text chat application, and instant messaging application.

19. An article comprising at least one non-transitory storage medium containing instructions that when executed cause a system to:
receive a request to pre-allocate resources for a packet-switched real-time, interactive application, the pre-allocated resources normally allocated during a call setup procedure, wherein the pre-allocated resources enable avoidance of allocating the resources during a call setup procedure, wherein the pre-allocated resources include at least one of hardware, software, and communications elements of the system, wherein the at least one of hardware, software, and communications elements of the system include resources related to a link with a predetermined quality of service;
in response to the request, pre-allocate the resources and store information pertaining to the pre-allocated resources in a storage, wherein the pre-allocating includes storing a pointer associated with a particular mobile station or a particular group of mobile stations, where the pointer indicates that the pre-allocated resources are useable by the particular mobile station or particular group of mobile stations for call setup; and
subsequent to pre-allocating the resources, process a call setup request from the particular mobile station or member of the particular group of mobile stations using the pre-allocated resources.

20. The article of claim 19, wherein the pre-allocated resources include at least one of user-related information, binding information, and mobility information, wherein the system comprises a base station controller having the storage to store the at least one of the user-related information, binding information, and mobility information.

21. The article of claim 19, wherein the link includes an Internet Protocol (IP) route having the predetermined quality of service.

22. The article of claim 19, wherein the pre-allocated resources include a pre-allocated Internet Protocol (IP) route having the predetermined quality of service.

23. A method of communicating in a wireless network, comprising:
by a controller having a processor, the controller being coupled to an interface to a communications network:
receiving a request to pre-allocate call setup resources to a packet-switched real-time, interactive application;
in response to the request, pre-allocating the call setup resources, wherein the pre-allocated call setup resources include at least one of hardware, software, and communications elements, the at least one of hardware, software, and communications elements comprising a pre-allocated Internet Protocol (IP) route having a particular quality of service;
receiving a call setup request after pre-allocating the call setup resources; and
in response to the call setup request, setting up a packet-switched real-time, interactive communications session using the pre-allocated call setup resources including the pre-allocated IP route, wherein the pre-allocated call setup resources enable avoidance of allocating the pre-allocated call setup resources during a call setup procedure in response to the call setup request.

* * * * *